Figures 1, 2:
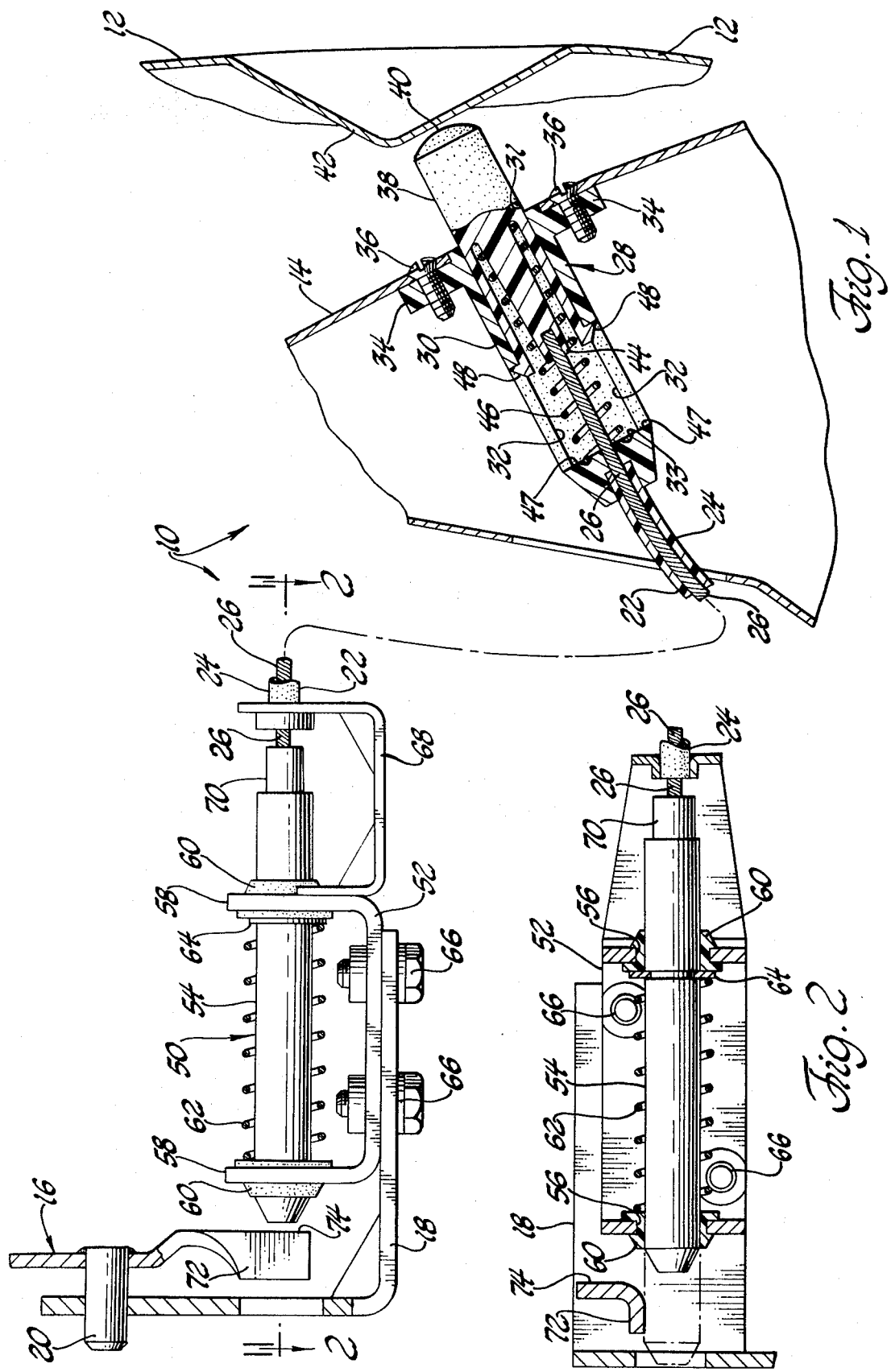

United States Patent [19]

Leichtl

[11] 3,788,685

[45] Jan. 29, 1974

[54] BOWDEN CABLE LATCH RELEASE MECHANISM

[75] Inventor: Ludwig Leichtl, Emmaus, Pa.

[73] Assignee: McCord Corporation, Detroit, Mich.

[22] Filed: Apr. 17, 1972

[21] Appl. No.: 244,817

[52] U.S. Cl................. 296/65 A, 180/112, 297/379
[51] Int. Cl............................................... B60n 1/00
[58] Field of Search .. 296/65 A, 65 R, 63; 297/379; 180/111, 112, 113

[56] References Cited
UNITED STATES PATENTS

| 3,028,199 | 4/1962 | Beierbach | 297/379 |
| 2,624,613 | 1/1953 | Parmely | 296/65 A |
| 2,874,993 | 2/1959 | Probst | 296/65 A |

FOREIGN PATENTS OR APPLICATIONS

| 1,430,385 | 10/1968 | Germany | 296/65 A |
| 1,430,254 | 11/1968 | Germany | 296/65 A |

Primary Examiner—David Schonberg
Assistant Examiner—John A. Pekar
Attorney, Agent, or Firm—McGlynn and Milton

[57] ABSTRACT

This invention provides a seat back release mechanism for tiltable automobile seats actuated by an automobile door which includes a flexible motion transmitting remote control cable for transmitting compressive and tensile forces in a curved path; a reciprocating piston member connected to one end of the remote control cable, mounted in a housing, and adapted to transmit a compressive force in response to the closure of the automobile door, and a latch mechanism connected to the other end of the remote control cable for engaging and latching the seat back whereby the seat back is held substantially upright and is restricted from forward tilting movement when the automobile door is closed.

6 Claims, 2 Drawing Figures

PATENTED JAN 29 1974 3,788,685

BOWDEN CABLE LATCH RELEASE MECHANISM

This invention relates to a seat back release mechanism for tiltable automobile seats which is actuated by an automobile door. More specifically the mechanism prevents the seat back of an automobile from being forwardly tilted when the automobile door is closed and allows forward tilting movement of the seat back when the automobile door is open.

It is common practice for two door model automobiles which have front and rear seats to provide the front seat with a forwardly tiltable seat back to facilitate the entrance and exit of passengers to and from the rear seat. In recent years it has become increasingly necessary, if not required, to provide a latching mechanism which dependably secures the seat back against forward tilting movement when the automobile is underway. This is primarily a safety feature which prevents passengers in the rear seat from being hurled into the forward section of the automobile during sudden stops which frequently occur in emergency situations and accidents.

It is therefore an object and feature of the instant invention to provide a seat back release mechanism for tiltable automobile seats actuated by an automobile door comprising flexible motion transmitting remote control means for transmitting compressive and tensile forces in a curved path reciprocating means connected to a first end of said remote control means for transmitting a compressive force in response to the closure of the automobile door, and latch means connected to a second end of the remote control means for engaging and latching the seat back in response to the compressive force whereby the seat back is held substantially upright and is restricted from forward tilting movement when the automobile door is closed.

It is a further object and feature of the instant invention to provide such a seat back release mechanism wherein the remote control means includes an elongatable casing anchored at both ends thereof and a flexible core element slidably disposed therein for transmitting compressive and tensile forces in a curved path.

In correlation with the foregoing objects and features, it is another object and feature of the instant invention to provide a seat back release mechanism wherein the latch means includes resilient means for urging the latch means out of engagement with the seat back whereby the seat back is free for forward tilting movement when the automobile door is open.

Other objects and features of the instant invention will become apparent as the same becomes better understood by reference to the following detailed description when considered in connection with the accompanying drawings wherein:

FIG. 1 is a front elevational view partially in cross section of a preferred embodiment of the instant invention; and FIG. 2 is a cross-sectional view taken along line 2—2 of FIG. 1.

Referring to the drawings a seat back release mechanism for tiltable automobile seats is generally shown at 10. The drawings illustrate a partial cutaway section of the automobile door 12 and also a partial cutaway section 14 of the automobile body which comprises a small section of the door jamb for the automobile door 12. The lower portion of a seat back is generally indicated at 16 and is pivotally mounted on a support or base plate 18 by pin 20.

The mechanism 10 includes a flexible motion transmitting remote control means 22 for transmitting compressive and tensile forces in a curved path. The remote control means 22 includes a casing 24 achored at both ends thereof and a flexible core element 26 slidably disposed therein. The casing 24 is elongatable or longitudinally stretchable for reasons which will be hereinafter described.

The mechanism 10 includes reciprocating means generally indicated at 28 which comprises the output or sending portion of the mechanism 10.

The reciprocating means 28 includes a substantially stationary housing member 30 including a central bore 32 extending partially therethrough to define an opening 31 at one end and a wall 33 at the opposite end thereof. The housing member 30 has integral flange elements 34 which have holes to receive fasteners 36 for mounting the housing member 30 within the body 14 of the automobile. A reciprocating piston member 38 is mounted within the housing member and is adapted to move generally in and out of the housing member 28 and includes an outer end 40 for engagement with a protrusion 42 disposed on the automobile door 12. An inner end 44 of the piston member 38 is connected to the core element 26 of the cable means 22. A resilient member 46 comprising a coil spring is disposed within the central bore 32 of the housing member 28 and is adapted to engage the piston member 38 for urging the piston member 38 out of the housing member 28.

The housing member 28 and piston member 38 may be constructed of a durable plastic material which is relatively inexpensive and easy to form and yet possesses the required durability and strength, however, it is not the intention to limit the construction materials to plastic. The housing member 28 may also include longitudinal slots 47 which register with extending flanges 48 disposed on the inner end 44 of the piston member 38 to prevent the piston member 38 from sliding out of the housing member 28.

A latch means generally indicated at 50 comprising the input or receiving portion of the mechanism 10 is mounted generally in close proximity to the front seat of the automobile for engaging and latching the seat back for restricting the forward tilting movement thereof when the automobile door 12 is closed. The latch means 50 includes a support member 52 which is generally U-shaped. A latch bolt 54 extends through holes 56 in the arms 58 of the support member 52. Angular rings 60 are provided within holes 56 of the support member 52 to facilitate the sliding movement of the latch bolt 54. A resilient means 62, comprising a coil spring coacts with the support member 52 and a snap ring 64 on the latch bolt 54 to urge the latch bolt 54 to the right, the unengaged position.

The support member 52 is mounted on the base plate 18 by fasteners 66. A rear connecting portion 68 of the support member 52 is provided to anchor the casing 24 of the cable means 22. The core 26 of the cable means 22 extends through portion 68 and is attached to the rear end 70 of latch bolt 54.

When the car door 12 is in a generally opened position, the coil spring 46 urges the piston member 38 to an outward most position with respect to the housing member 28 as shown in FIG. 1. The coil spring 62 simultaneously urges the latch bolt 54 generally to the right, as shown in the drawings, and out of engagement with the depending flange 72 of the seat back 16. Upon closing the automobile door 12 the piston member 38 moves inwardly causing a compressive force to be transmitted through cable means 22 and forcing latch bolt 54 past the flange 72 on the seat back 16 thereby restricting the forward tilting movement of the seat back.

In the event that the automobile door 12 is closed while the seat back 16 is in a forwardly tilted position; in other words, not in the upright position, the latch bolt 54 abutts the surface 74 of the flange 72 and rides thereon until the seat back 16 is moved to the upright position thereby allowing the latch bolt 54 to move past the flange element 72. In this situation the piston member 38 is forced within the housing member 28 by the door 12 and the latch bolt 54 is in a retracted or semi-unengaged position due to the impedance of the surface 74 of the flange 72, consequently there is an excessive amount of core element 26 between the input portion and the output portion of mechanism 10. The extra length is taken up because the casing 24 of the remote control means 22 is elongatable. The compressive force which the piston member 38 has attempted to transmit to latch bolt is effectively stored in the remote control means 22 until the seat back is tilted to an upright position thereby allowing the stored compressive force to move the latch bolt 54 into the engaged position. In other words, when the car door 12 is closed as the seat back 16 is tilted forwardly so that the latch bolt is prevented from moving to the left as viewed, the movement of the core element to the left as a result of the piston member 38 being moved into the housing 30 is accomodated by an elongation or stretching of the casing 22.

Obviously many modifications and variations of the instant invention are possible in light of the above teachings it is therefore to be understood that the invention may be practiced otherwise and as specifically described within the scope of the appended claims.

The embodiments of the invention in which an exclusive property or privilege is claimed are defined as follows:

1. A seat back release mechanism for tiltable automobile seats tiltable between an upright and forwardly tilted position actuated by an automobile door comprising: a flexible motion transmitting remote control means for transmitting compressive and tensile forces in a curved path, reciprocating means connected to a first end of said remote control means for transmitting a compressive force in response to closure of the automobile door, and latch means connected to a second end of said remote control means for engaging and latching the seat back in response to a compressive force whereby the seat back is held substantially upright and is restricted from forward tilting movement when the automobile door is closed; said flexible motion transmitting remote control means includes a casing anchored to said reciprocating means at one end and to said latch means at the other end and a flexible core element slidably disposed within said casing and operatively connected to said reciprocating means and said latch means, said casing being resiliently elongatable whereby said motion transmitting remote control means is capable of transmitting a compressive force when the seat is upright and storing a compressive force when the seat is forwardly tilted.

2. A mechanism as set forth in claim 1 wherein said latch means includes resilient means for urging said latch means out of engagement with said seat back whereby the seat back is free for forward tilting movement when the automobile door is open.

3. A mechanism as set forth in claim 1 wherein said reciprocating means includes a substantially stationary housing member having a central bore extending partially therethrough, a reciprocating piston member adapted to move generally in and out of said housing member including an outer end for engagement with the automobile door and an inner end for connection with said core element, and resilient means disposed within said housing member for urging said piston member outwardly.

4. A mechanism as set forth in claim 3 wherein said latch means is adapted for being mounted generally adjacent a portion of the seat back for restrictive engagement therewith and includes a support member, a latch bolt slidably supported by said member and selectively slidable from an engaged to an unengaged position, and resilient means for coacting with said support member for urging said latch bolt to the unengaged position in the absence of a transmitted compressive force.

5. A seat back release mechanism for tiltable automobile seats actuated by an automobile door comprising; mechanical motion transmitting means including a resiliently elongatable casing and a flexible core element slidably disposed in said casing for transmitting compressive and tensile forces, reciprocating means including a housing and a reciprocating member, said reciprocating member being connected to a first end of said core element for responding to the closure of the automobile door, and latch means including a support member and a latch member, said latch member being connected to a second end of said core element for engaging the seat back in response to inward axial movement of said reciprocating means by the closing of automobile door, said casing being anchored to said housing and to said support member.

6. A mechanism as set forth in claim 5 wherein said latch means includes resilient means for urging said latch means out of engagement with the seat back.

* * * * *